(12) United States Patent
Spindle

(10) Patent No.: US 9,381,124 B2
(45) Date of Patent: Jul. 5, 2016

(54) WHEELCHAIRS AND WHEELED VEHICLES

(71) Applicant: Michael Jeffrey Spindle, Radlett (GB)

(72) Inventor: Michael Jeffrey Spindle, Radlett (GB)

(\*) Notice: Subject to any disclaimer, the term of this patent is extended or adjusted under 35 U.S.C. 154(b) by 0 days.

(21) Appl. No.: 14/561,846

(22) Filed: Dec. 5, 2014

(65) Prior Publication Data

US 2015/0150737 A1 Jun. 4, 2015

Related U.S. Application Data

(62) Division of application No. 12/278,397, filed as application No. PCT/GB2007/000334 on Jan. 30, 2007, now Pat. No. 8,905,420.

(30) Foreign Application Priority Data

Feb. 6, 2006 (GB) .................................. 0602322.0

(51) Int. Cl.
| | |
|---|---|
| *A61G 5/00* | (2006.01) |
| *A61G 5/02* | (2006.01) |
| *A61G 5/10* | (2006.01) |
| *B62D 17/00* | (2006.01) |
| *A61G 5/08* | (2006.01) |
| *A61G 5/12* | (2006.01) |
| *A61G 7/05* | (2006.01) |

(52) U.S. Cl.
CPC .. *A61G 5/02* (2013.01); *A61G 5/00* (2013.01); *A61G 5/10* (2013.01); *B62D 17/00* (2013.01); *A61G 5/101* (2013.01); *A61G 5/107* (2013.01); *A61G 5/1008* (2013.01); *A61G 5/1024* (2013.01); *A61G 5/1027* (2013.01); *A61G 5/1035* (2013.01); *A61G 2005/0883* (2013.01); *A61G 2005/0891* (2013.01); *A61G 2005/1078* (2013.01); *A61G 2005/1083* (2013.01); *A61G 2005/1089* (2013.01); *A61G 2005/1094* (2013.01); *A61G 2005/1097* (2013.01); *A61G 2005/128* (2013.01); *A61G 2007/0528* (2013.01); *Y10T 403/7026* (2015.01)

(58) Field of Classification Search
CPC ... A61G 5/02; A61G 5/10; A61G 2005/1054; A61G 2005/1097; B62D 17/00
USPC ............. 280/250.1, 225, 283, 62, 304.1, 647, 280/642, 650
See application file for complete search history.

(56) References Cited

U.S. PATENT DOCUMENTS

| | | | | |
|---|---|---|---|---|
| 2,896,693 A | * | 7/1959 | Schladebach | A61G 5/08 280/250.1 |
| 4,428,594 A | * | 1/1984 | Minnebraker | A61G 5/00 16/30 |
| 4,592,570 A | * | 6/1986 | Nassiri | A61G 5/00 280/250.1 |
| 4,653,773 A | * | 3/1987 | Graft | B62D 7/00 180/257 |
| 4,768,797 A | * | 9/1988 | Friedrich | A61G 5/08 280/250.1 |
| 5,028,065 A | * | 7/1991 | Danecker | A61G 5/00 152/323 |

(Continued)

*Primary Examiner* — Joseph Rocca
*Assistant Examiner* — Maurice Williams
(74) *Attorney, Agent, or Firm* — Robert Plotkin, P.C.; Robert Plotkin

(57) ABSTRACT

A wheeled vehicle, wherein at least one ground-engaging wheel is connected to a pivotable hub, the pivotable hub being attached to the body of the vehicle by a fixed pivot member and a laterally-adjustable pivot member, the position of the laterally-adjustable pivot member being adjustable to cause the hub to pivot and thereby adjust the camber of the said wheel, and wherein the pivotable hub is provided with one or more lugs arranged to engage the laterally-adjustable pivot member when the wheels are in a minimum or maximum camber position.

4 Claims, 16 Drawing Sheets

FRONT VIEW
ADJUSTABLE CAMBER AT MAXIMUM INCLINATION

(56) References Cited

U.S. PATENT DOCUMENTS

| | | | | |
|---|---|---|---|---|
| 5,267,745 A * | 12/1993 | Robertson | A61G 5/00 | 280/250.1 |
| 5,590,893 A * | 1/1997 | Robinson | A61G 5/00 | 280/250.1 |
| 5,662,345 A * | 9/1997 | Kiewit | A61G 5/10 | 280/250.1 |
| 6,168,177 B1 * | 1/2001 | Schillo | A61G 5/10 | 280/250.1 |
| 6,182,992 B1 * | 2/2001 | Garven, Jr. | A61G 5/10 | 280/250.1 |
| 2001/0011805 A1 * | 8/2001 | Kueschall | A61G 5/00 | 280/250.1 |
| 2002/0145271 A1 * | 10/2002 | Sanchez | A61G 5/023 | 280/658 |
| 2003/0034635 A1 * | 2/2003 | Ludovici | A61G 5/10 | 280/647 |
| 2003/0218310 A1 * | 11/2003 | Volk | A61G 5/08 | 280/250.1 |
| 2003/0227151 A1 * | 12/2003 | Schreiber | A61G 5/10 | 280/86.751 |
| 2006/0049593 A1 * | 3/2006 | Schreiber | A61G 5/10 | 280/86.751 |
| 2006/0049608 A1 * | 3/2006 | Schreiber | A61G 5/10 | 280/250.1 |
| 2006/0055143 A1 * | 3/2006 | Schreiber | A61G 5/10 | 280/250.1 |
| 2006/0087103 A1 * | 4/2006 | Schreiber | A61G 5/08 | 280/649 |
| 2006/0220335 A1 * | 10/2006 | Damm | B60G 7/006 | 280/86.757 |
| 2007/0080513 A1 * | 4/2007 | Osterlanger | B60G 3/26 | 280/86.751 |
| 2008/0143172 A1 * | 6/2008 | Borisoff | A61G 5/10 | 301/111.06 |

\* cited by examiner

BACKREST RECLINED

BACKREST UPRIGHT

FRONT VIEW
NON-ADJUSTABLE CAMBER VERSION

FRONT VIEW

ADJUSTABLE CAMBER AT ZERO

FRONT VIEW

ADJUSTABLE CAMBER AT MAXIMUM INCLINATION

FOLDED

HILLCLIMB ANTI-ROLLBACK (RATCHET) FEATURE

QUICK RELEASE CLEVIS MECHANISM

BRAKE LEVER RETRACTED

REST POSITION

PARKING BRAKE PARTIALLY APPLIED

PARKING BRAKE FULLY APPLIED

WHEELCHAIRS AND WHEELED VEHICLES

BACKGROUND TO THE INVENTION

This invention relates to wheelchairs, and to other wheeled vehicles including, but not limited to, small personal vehicles of the nature of tricycles and the like.

Many current wheelchairs have a well-known four wheel design, in which a pair of large rear wheels are propelled by the user and two smaller front castors facilitate manoeuvring. Whilst satisfying many of the requirements of users, this arrangement of wheels is not ideally suited to anything other than smooth surfaces, since the front castors, which are limited by the layout to be small in diameter, have difficulty overcoming obstacles such as gravel, sand and small rocks encountered in off-road conditions. In addition, in uphill as opposed to downhill conditions the weight distribution of the user about the chair is altered, which may lead to an unstable condition. There is also a risk that conventional wheelchairs can tip backwards when the user pushes hard on the wheels in order to accelerate.

In some alternative wheelchair designs, the drive wheels and the castor wheels have been reversed, such that the two large propelling wheels are at the front and the two castors are rearmost. This provides a more satisfactory solution to negotiating off-road conditions, and has reduced the tendency of the wheelchair to tip backwards under acceleration.

However, as the surfaces encountered by a wheelchair user, particularly off-road, are not likely to be smooth and level, a four-wheeled wheelchair of the front-drive design can find itself with only three of the wheels in contact with the ground and one wheel raised clear. If one of these wheels is a driving wheel, the user may become immobilised, requiring assistance. This has led to the development of three-wheeled wheelchairs, having two large propelling wheels at the front and a single trailing castor wheel at the rear. The single trailing castor prevents the wheelchair from tipping backwards when accelerating forwards. Being three-wheeled, such a wheelchair has all three wheels in contact with the ground, whatever the unevenness of the terrain.

However, it has been found that existing three-wheeled wheelchairs are sometimes highly unstable, particularly in off-road conditions and when traversing inclines or stopping on inclines. In such cases, the three-wheeled wheelchair has been known to topple over, which can cause an accident or an injury to the user. Such problems are believed to be a consequence of the relatively high centre of gravity of a user when using a three-wheeled wheelchair.

The driving wheels (i.e. the wheels that are propelled by the user's hands) of a wheelchair are sometimes cambered. This cambering, whereby the wheels are angled such that the bottom of each wheel is further out from the body of the wheelchair than is the top of each wheel, is often done to enhance the stability of the wheelchair and to place the top of the driving wheels within easier reach of the user's hands. However, a problem experienced by users of such wheelchairs is that the width of the wheelchair across the driving wheels is sometimes too large to enable the wheelchair to fit through doorways, between furniture or past obstacles.

A further problem experienced by wheelchair users is that, when ascending a slope or incline, the wheelchair has a natural tendency to roll backwards. This may happen when the user releases their hands from the driving wheels, between pushes, or if the user wishes to stop on the incline for some reason. This tendency of a wheelchair to roll backwards may lead to accident or injury to the user or to a bystander, particularly if the wheelchair runs backwards out of control and/or topples over.

Finally, a further problem experienced by wheelchair users is that it can be awkward assembling a collapsible or disassemblable wheelchair, particularly if the user has use of only one hand. Thus, there is a desire to be able to join structural members easily, preferably using only one hand, but nevertheless such that the members are reliably joined. It will be appreciated that there is also a desire to be able to readily disassemble components, again preferably with only one hand.

SUMMARY OF THE INVENTION

According to a first aspect of the present invention there is provided a wheelchair comprising: three or more ground-engaging wheels; and a user seat, the user seat forming a structural member or monocoque on which the ground-engaging wheels are supported; wherein at least one of the wheels is connected to the seat by a support member, the length of the support member being adjustable during use.

The length of the support member being adjustable during use advantageously provides a means for the user to lower the centre of gravity of the wheelchair in use, thereby rendering the wheelchair more stable on uneven or inclined terrain, and reducing the tendency for the wheelchair to topple. As well as being able to lower (or raise) the centre of gravity of the wheelchair, this also provides a means by which the centre of gravity may be moved forwards or backwards, which is also beneficial to the stability of the wheelchair when tackling ascents or descents. Moreover, adjusting the length of the support member also effects a change in the backrest angle, which may itself be beneficial for a number of reasons (even when the wheelchair is on a flat surface or is stationary)—e.g. to enable the user to sleep, to relieve pressure on certain parts of the user's anatomy, or to enable him to recline. Thus, the weight distribution of the wheelchair can be altered without the need to disassemble the wheelchair. If the length of the support member can be set to any length (within upper and lower limits), this enables the weight distribution of the wheelchair to be effectively infinitely adjustable (within corresponding limits).

Preferably the support member incorporates resilient means biased towards an extended configuration. The length of such resilient means may be readily shortened by the user leaning towards the support member whilst remaining seated, thereby providing a simple way for the user to lower the centre of gravity of the wheelchair whilst remaining seated. Conversely, the centre of gravity of the wheelchair may be raised by the user leaning away from the support member, thereby taking his weight off the support member and enabling it to resiliently extend.

The resilient means may serve as a shock absorber in use, which may advantageously provides a cushioning effect for the user, whatever the length of the support member.

Preferably the support member further incorporates means for locking the resilient means in a compressed configuration. This advantageously enables the centre of gravity of the wheelchair to be retained in a lower position for an extended period of time, thereby facilitating use of the wheelchair off-road or on an incline.

The resilient means may comprise a gas spring or a shock absorber spring. Other resilient means may be known to those skilled in the art of mechanical engineering.

Preferably the support member has an adjustable telescopic form. This advantageously provides a compact configuration of the support member, whilst enabling its length to be adjusted by the user as required.

Preferably the support member supports a rear ground-engaging wheel. This advantageously enables the user to reduce the length of the support member simply by leaning back into his seat.

Particularly preferably the rear ground-engaging wheel is a castor wheel. Such a castor wheel has a natural tendency to align parallel with the driving wheels in use, thereby facilitating directional control of the wheelchair.

Preferably the wheelchair further comprises a strut (e.g. a wishbone strut) coupled between the user seat and a region of the support member near its wheel. Such an arrangement advantageously provides a robust suspension arrangement for the wheelchair.

In preferred embodiments the wheelchair has two opposing front ground-engaging wheels and one or more rear ground-engaging wheels, the front wheels having a substantially greater diameter than the rear wheel(s), such that the user may propel the chair by action of his hands on the front wheels. Preferably, though, the wheelchair has a single rear ground-engaging wheel, thereby providing more stability on uneven or off-road surfaces. The or each rear ground-engaging wheel is preferably a castor wheel, to facilitate directional control of the wheelchair.

The or each castor wheel is preferably provided with a detent mechanism arranged to bias the wheel into a configuration in which it is parallel with the front wheels. This advantageously further improves the directional control of the wheelchair.

The wheelchair may further comprise means for attaching one or more accessories selected from a group comprising: an umbrella, a transfer board, a food tray.

According to a second aspect of the invention there is provided a wheeled vehicle (for example, but not necessarily, a wheelchair), wherein at least one ground-engaging wheel has an axle connected to a pivotable hub, the pivotable hub being attached to the body of the vehicle by a fixed pivot member and a laterally-adjustable pivot member, the position of the laterally-adjustable pivot member being adjustable to cause the hub to pivot and thereby adjust the camber of the said wheel.

This ability to adjust the camber of one or more wheels advantageously enables a wheelchair user (or other vehicle user) to set the camber of the wheels to suit his environment. Thus, the bottom of the wheels may be displaced outwards, to improve the stability of the wheelchair on uneven terrain, and to bring the top of the wheels nearer to the user's hands, to facilitate propulsion. Alternatively, the wheels may be adjusted into a perpendicular (zero camber) configuration, such that the overall width of the wheelchair is then as narrow as possible, thereby facilitating passage of the wheelchair through narrow doorways and the like.

Preferably the laterally-adjustable pivot member incorporates a thread, and the said pivot member is threaded onto a cross-shaft that may be rotated in order to adjust the position of the said pivot member. Such a threaded arrangement facilitates adjustment of the camber, over a wide range of camber angles.

The cross-shaft may be provided with a handwheel to facilitate operation by the user. Alternatively, the cross-shaft may be provided with an arrangement of cogs or gears that is operable by the user. In such a case, the arrangement of cogs or gears may comprise a crown wheel attached to the cross-shaft, coupled to a bevel gear or pinion, which in turn is coupled to a handle or a motor operable by the user.

Alternatively, the wheelchair or wheeled vehicle may further comprise a belt or clutch arrangement that is engageable between the cross-shaft and a ground-engaging wheel, such that rotation of the ground-engaging wheel may be used to effect rotation of the cross-shaft. Thus, the camber may be readily adjusted using one (or both) ground-engaging drive wheels, the operation of which are familiar to the wheelchair user. Additionally, this provides the advantage that the camber can be adjusted using torque derived from the normal rolling motion of the wheelchair—a physically easier way of adjusting the camber for many users. Moreover, mechanical advantage may be obtained through using the hand-operated drive wheels to adjust the camber, by virtue of the large diameter of the drive wheels.

Particularly preferably the cross-shaft is threaded through a pair of laterally-adjustable pivot members, each laterally-adjustable pivot member being arranged to cause a respective hub to pivot, thereby enabling the camber of a pair of wheels to be adjusted simultaneously. In such a case, preferably each of the pair of laterally-adjustable pivot members is threaded onto the cross-shaft using a mutually opposing thread.

The pivotable hubs may each be provided with one or more lugs arranged to engage onto the cross-shaft or onto a laterally-adjustable pivot member when the wheels are in a minimum or maximum camber position. This advantageously prevents or mitigates unwanted lateral motion of the cross-shaft and wheel assembly when set to a minimum or maximum camber.

In a further alternative, the laterally-adjustable pivot member may be freely slidable. This advantageously enables the user to simply grip the wheels and manually pivot them, in order to alter the camber of the wheels. The laterally-adjustable pivot member may be spring biased, thereby advantageously returning the wheels to a cambered configuration (or alternatively to a zero camber configuration, depending on the arrangement of the spring biasing) when they are released by the user.

Preferably the wheelchair or wheeled vehicle further includes means for locking the camber of the wheel(s). This enables the wheels to be locked in a desired degree of camber for an extended period of time.

According to a third aspect of the invention there is provided a wheelchair, wherein a ground-engaging wheel on each side of the wheelchair is provided with a brake, each brake being connected to corresponding brake actuation means mounted on or near the user's seat and arranged such that the user may operate a brake actuation means to retard the corresponding wheel independently of the other wheel.

This advantageously facilitates the braking of the wheelchair by the user during motion of the wheelchair.

Each brake may be a drum brake, or alternatively may be a disc brake. The brake actuation means preferably comprise brake levers.

Preferably the wheelchair has a pair of relatively large diameter ground-engaging driving wheels with which the user's hands propel the wheelchair in use, and it is preferably on these wheels that the brakes are arranged to act.

Particularly preferably the action of the brakes is such as to enable the wheelchair to be steered by braking a wheel on one side of the wheelchair to a greater or lesser degree than the wheel on the other side of the wheelchair. This provides a highly advantageous way in which the wheelchair may be steered, and is particularly beneficial to wheelchair sportspeople or those involved in off-road or downhill wheelchair activities.

According to a fourth aspect of the invention there is provided a wheeled vehicle (for example, but not necessarily, a wheelchair), in which one or more ground-engaging wheels are provided with ratchet means, the ratchet means being operable to allow rotation of the wheel in a forward direction and to prevent rotation of the wheel in a reverse direction.

Such ratchet means advantageously enable the wheelchair (or other wheeled vehicle) to be used on an upward incline, without danger of the wheelchair rolling backwards.

Preferably the ratchet means comprise an annular ratchet and a selectively-engageable pawl.

Preferably the selectively-engageable pawl is biased towards the ratchet by spring means.

Particularly preferably the selectively-engageable pawl is movable from a first position in which it engages the ratchet, to a second position in which it does not engage the ratchet. This advantageously enables the user to activate or deactivate the ratchet means as required. For example, if the wheelchair is moving on a flat or downhill surface there would be no benefit in activating the ratchet means (which may be audible, as is common with ratchet-type devices). Alternatively, the user may need to be able move the wheelchair backwards, for example if playing a wheelchair sport such as basketball.

According to a fifth aspect of the invention there is provided a coupling arrangement for releasably joining two structural members, wherein a clevis is provided on one of the structural members, and a resiliently-biased member is provided on the other structural member, the resiliently-biased member being adapted to engage with a corresponding aperture or recess provided in the clevis; wherein: the resiliently-biased member comprises a first region having a first cross-section and a second region having a second cross-section, the second cross-section being narrower than the first cross-section; the aperture or recess in the clevis is shaped and sized to receive the first region of the resiliently-biased member; and the clevis further comprises a guide channel associated with and in communication with the said aperture or recess, the guide channel having a width that is less than that of the associated aperture or recess, the width of the guide channel being such as to receive the second region but not the first region of the corresponding resiliently-biased member; the coupling arrangement being such that, in use, the second region of the resiliently-biased member may be inserted along the guide channel and into the associated aperture or recess, at which point the resilient bias of the resiliently-biased member is arranged to cause the first region of the resiliently-biased member to engage with the aperture or recess.

The provision of the guide channel and the second region of the resiliently-biased member advantageously facilitates the engagement of the resiliently-biased member into the aperture or recess. This is particularly applicable, but by no means limited, for use with collapsible wheelchairs, since it enables parts of the wheelchair to be fitted together using only one hand.

Preferably the first cross-section is circular. This advantageously enables rotational movement of one structural member relative to the other.

Preferably the second cross-section has two substantially parallel sides. This advantageously facilitates the introduction of the second region along the guide channel.

Preferably the resiliently-biased member is one of a pair of axially-opposing resiliently-biased members, and the clevis incorporates a corresponding pair of opposing apertures or recesses, each with a corresponding guide channel.

The entry to the or each guide channel may be tapered or chamfered, the tapering or chamfering being such as to cause the or each resiliently-biased member to move against the direction of its resilient bias. Such tapering or chamfering advantageously facilitates the introduction of the resiliently-biased members into the guide channels, and further facilitates single handed operation of the coupling arrangement.

Preferably the or each resiliently-biased member is outwardly biased.

Such a coupling arrangement may advantageously be provided to couple the support member of a wheelchair in accordance with the first aspect of the invention to the wheelchair's seat.

According to a sixth aspect of the invention there is provided a wheelchair comprising a user seat, an axially opposed pair of front ground-engaging wheels positioned on opposite sides of the user seat, and a single rear castor ground-engaging wheel positioned centrally behind the user seat, wherein the rear castor ground-engaging wheel is provided with a detent mechanism arranged to bias the wheel into a configuration in which it is parallel with the front wheels.

Preferably the detent mechanism comprises means for adjusting the degree to which the rear castor ground-engaging wheel is urged into the configuration in which it is parallel with the front wheels.

Preferably the detent mechanism comprises a cam fitted to a pivot shaft of the castor wheel, and spring means acting against the cam. The spring means may include a ball which is urged by the spring means against the cam. Adjustment means, such as one or more grub screws, may be provided in order to adjust the degree of compression of the spring means.

Preferably the grub screw is arranged so as to allow external access to the screws. This increases the ease of access to the screw should it become necessary for example, to adjust the screws. Providing external access allows the screw to be adjusted whilst the wheelchair is upright, without requiring dismantling of the castor wheel or the wheelchair.

The grub screw may be removable, so that the detent mechanism can be disabled if required. The ease of access to the screw also enables substitution of the spring for one of a higher rating if required. This provides a stronger resisting force on the castor wheel.

Preferably means are provided to limit the angular displacement of the castor, therefore preventing the castor from rotating 180° or more, which can occur under certain conditions, such as when the wheelchair is moving at high speeds or on uneven terrain. It may be possible to remove the restriction on angular displacement of the castor if required. For example the angular displacement may be restricted by a protuberance which can be moved in and out, for example by mounting it on the end of a grub screw. Alternatively, the protrusion may be formed on the end of a pin which can be locked in position.

In connection with any of the above aspects of the invention, a wheelchair may further comprise a spirit level type device to indicate to the user when the wheelchair is in a potentially unstable condition on an incline.

Preferably a brake system is provided having a brake lever which is rotatable in a clockwise or anticlockwise direction in order to effect a dynamic or parking brake as required. An advantage of this embodiment is that the user can, by movement of one lever, reduce the speed of the wheelchair whilst it is in motion, to a complete stop if necessary, and apply a parking brake once stationary. Preferably the rotatable brake lever can also be folded into a compact state to aid in transit of the wheelchair when not in use.

All the above aspects and features of the invention may be used in any combination with each other, as will be appreciated by those skilled in the art.

BRIEF DESCRIPTION OF THE DRAWINGS

Embodiments of the invention will now be described, by way of example only, and with reference to the drawings in which.

DETAILED DESCRIPTION OF PREFERRED EMBODIMENTS

Figure 1:
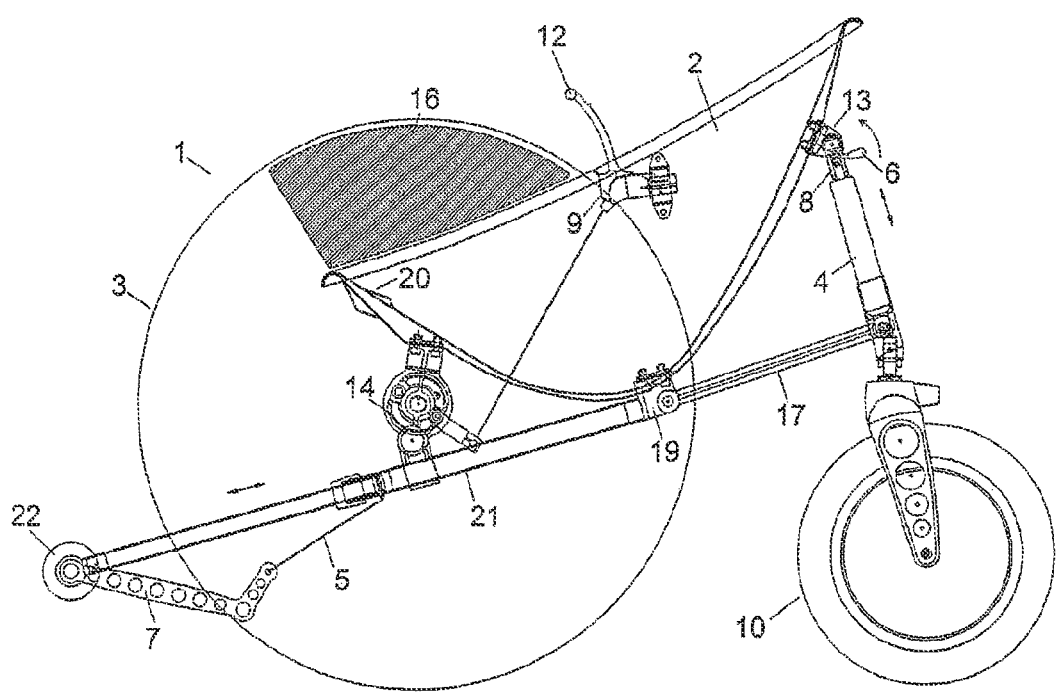
FIG. 1 is a side elevation of a wheelchair embodying aspects of the present invention.

The present embodiments represent the best ways known to the applicant of putting the invention into practice. However they are not the only ways in which this can be achieved.

By way of an initial overview, the preferred embodiments provide a wheelchair or similar vehicle for personal use, comprising ground-engaging wheels and a user seat forming a structural member or monocoque on which the ground-engaging wheels are supported. The user seat may be of metal, plastics or composite material, e.g. fibre-reinforced plastics. If the seat is of plastics material, it may be in the form of a shell which may be moulded to fit the contours of the body of the user and may comprise a surrounding lip or rim to add stiffness to the structure. Alternatively or additionally, the seat may comprise stiffening ribs. The seat may comprise a single skin or may comprise inner and outer skins which may be separated and joined by a lightweight core, e.g. of rigid foam or of honeycomb material. The seat may be formed locally with reinforcements to support brackets, fixings or the like by which the wheels and other components of the vehicle are supported on the seat.

The wheelchair of the present embodiments comprises a user seat, an axially opposed pair of front ground-engaging wheels (typically set in a fixed direction of travel) positioned on opposite sides of the user seat, and a single rear castor ground-engaging wheel (having a variable/rotatable direction of travel) positioned centrally behind the user seat. Such a tricycle arrangement, with a single castor wheel at the rear, is one in which the front wheels are both the driving and steering wheels, and this arrangement is advantageous since it is of relatively small turning circle and is able to negotiate uneven ground and small obstacles. Also such a wheelchair is relatively stable against backwards tipping but may require the provision of a stabilising wheel forward of the axis of the front wheels to prevent or reduce the possibility of the wheelchair from tipping over forwards, e.g. when braking sharply. The stabilising wheel may be spring-loaded to deflect if it encounters an obstacle, e.g. a kerb, when not fulfilling its stabilising function.

The driving/steering wheels may be spoked wheels and may be quickly detachable for storage in the normal way. Where the driving/steering wheels are spoked, they may be covered, e.g. by plastics or metal discs, to protect the user's fingers and/or to enhance the appearance of the wheelchair. The camber angle of the wheels may be altered by a device, adjustable by the user. This may be employed to effect a narrow track or width, suitable for going through narrow doorways, and at the other extent an effectively wider track for superior off road stability.

A spirit level type device, capable of being set or adjusted, may be provided on the wheelchair, to indicate to the user when the wheelchair is in an unstable condition on an incline.

An umbrella fixing may be provided on a bracket carried by the seat and preferably positioned in front of and below the seat. Storage brackets may be included.

The wheels may be carried on supports such as struts, to which a telescopic and foldable footrest may be attached. The arrangement may have one or more wheels attached to reduce the possibility of the wheelchair tipping forwards.

The wheel arrangement may have an engageable ratchet type device for preventing the wheelchair from rolling backwards, whilst pausing during the ascent of a slope, for example.

The vehicle may comprise a brake mechanism, e.g. a drum or disc brake mechanism, associated with one or more wheels, e.g. the steering or driving wheels of the vehicle, and which is operated by a lever, the arrangement being such that pivoting of the lever from a rest position operates the brake for normal operator-variable retardation. Independent brakes may be associated with the pair of driving and/or steering wheels. The brake may remain applied by the application of a locking lever or the brake may be rod operated and the applied brake may be locked by an over centre mechanism.

Means may be provided for biasing or for releasably locking the castor wheel in a position in which it is parallel to the front wheels to aid relatively high speed straight line motion of the wheelchair. The means may comprise providing the castor wheel with suitable rake and/or trail, and may comprise a detent member which tends to lock the castor wheel in the straight-ahead position. The detent member may be under the control of the wheelchair user.

The rear castor may be supported on a central strut carried by two outer wishbones. The length of the central strut may be altered by virtue of a telescopic design and capable of being locked in position. In such case the backrest angle of the chair may be adjustable, and therefore the weight distribution of the user about the wheelchair may be altered to a favourable situation. The adjustable rear strut may take the form of a gas spring with a variable length piston rod, lockable by a valve lever, which may maintain a shock absorbing feature in all positions.

Attached to the piston rod or strut may be a sprung loaded clevis type device, to attach the top of the strut to the rear of the seat back.

The whole arrangement may be foldable for storage in a compact manner for transportation or storage.

The driving/steering wheels may each comprise a user handrim in the normal way and which is graspable by the user to propel and to steer the wheelchair. If desired, a second handrim of different, e.g. smaller, diameter may also be provided to provide a form of gearing.

The wheelchair may comprise a seat which forms a structural member on which the wheels are mounted, as described above. The seat may have cut-outs to facilitate fitting of a seat belt.

To afford weather protection, a dedicated umbrella may be provided having an adaptable end fitting, the end fitting being engageable within a socket fitted to the wheelchair.

Figure 2:
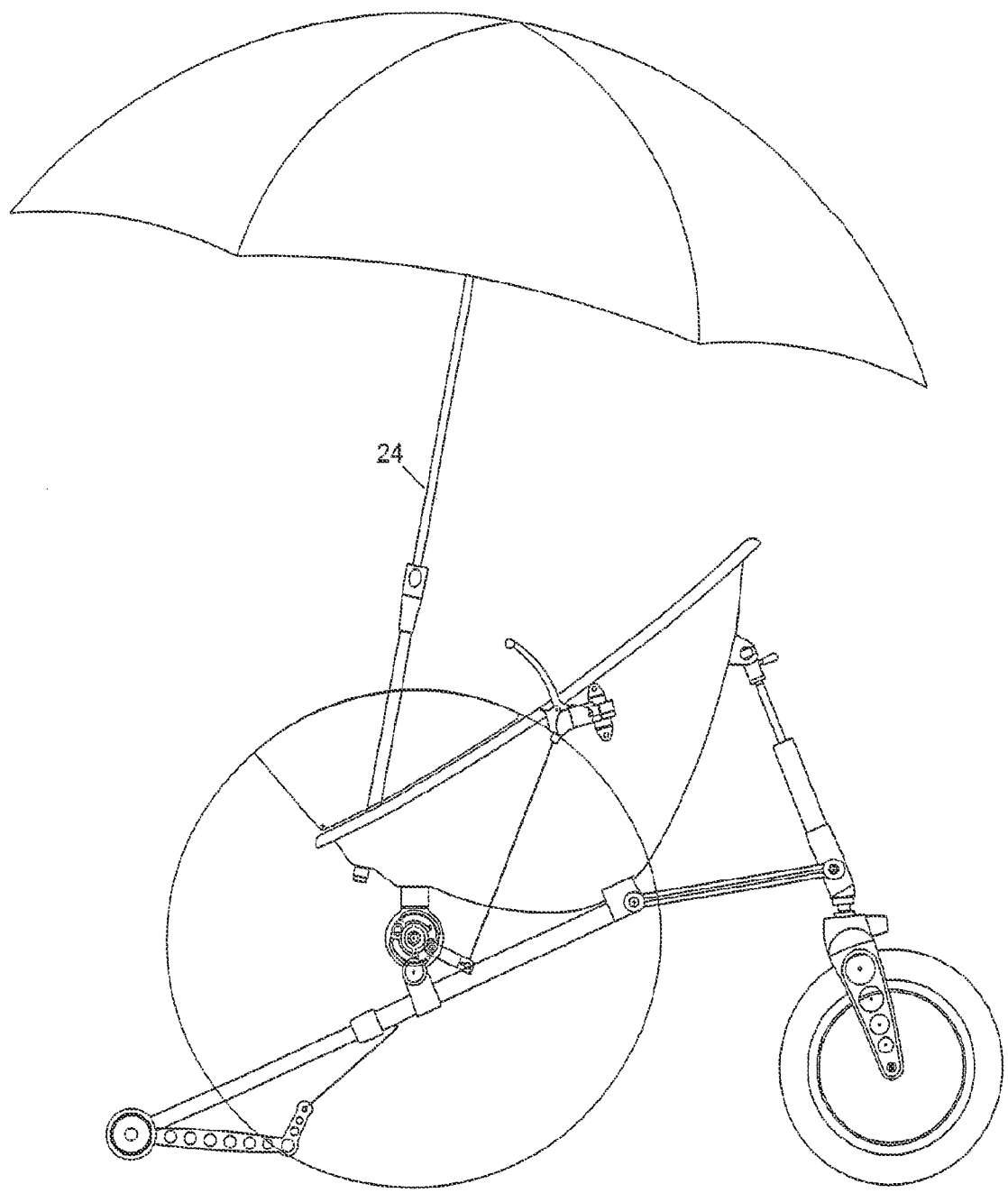
FIG. 2 is also a side elevation of the wheelchair of FIG. 1, with an umbrella in position.

Turning now to the figures in more detail, FIGS. 1 and 2 illustrate a wheelchair 1 comprising a seat member 2 which forms a shell-like structural member or monocoque to which the various components of the wheelchair are fixed. The seat may be of tubular metal frame or plastics and may be of single or dual skin fibre-reinforced plastics and may be formed with a surrounding flange or rim or raised features for increased rigidity. Threaded inserts may be moulded in for securing the various mounting brackets. By making the seat as a shell conforming to the shape of the user, possibly using a foam insert, it is possible to make the wheelchair more comfortable than is possible with conventional wheelchairs with canvas seats.

The wheelchair comprises an axially aligned pair of main driving and steering wheels 3 at the front of the wheelchair and a single central castor wheel 10 at the rear of the wheelchair. A pair of handles (not shown) may be fixed behind the seat for use by an assistant, if required. The handles may be of asymmetrical form, that is offset to one side. The wheelchair may be provided with a headrest (also not shown), which may for example be foldably mounted or detachable.

Figure 4:
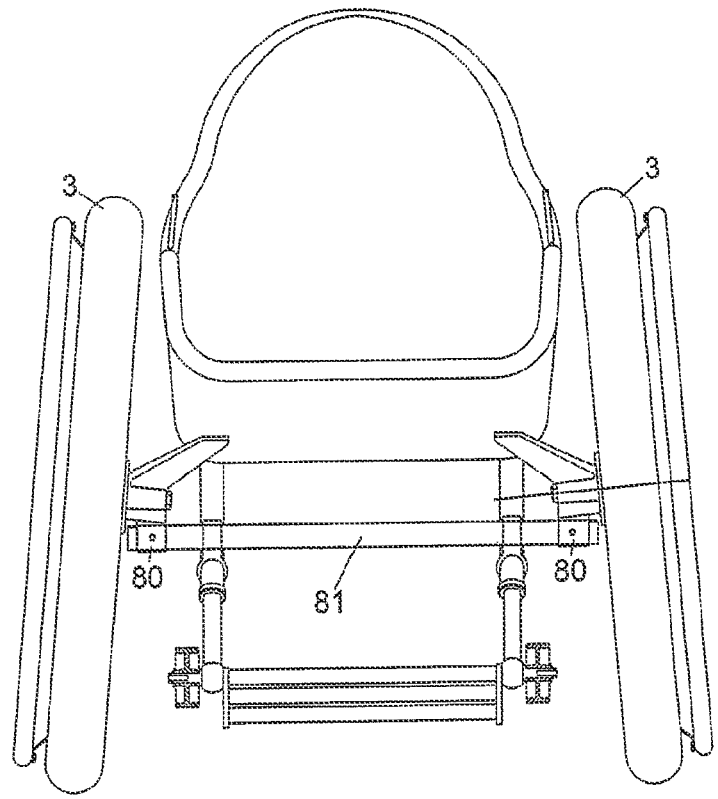
FIG. 4 is a frontal view of the wheelchair of FIG. 1 showing a non adjustable wheel camber configuration.

With passing reference to FIG. 4, in a fixed wheel camber configuration, the driving wheels 3 are detachably mounted on a pair of solid hubs 80 which are attached to the underside of the seat 2 and crossrail 81 which is in turn coupled to a parallel telescopic undercarriage assembly 21 (FIG. 1). The undercarriage carries a pair of anti-tip rollers 22 and a footrest 7 at its most forward point and may be lockable to suit various user leg lengths. The angle of the footrest 7 may be adjusted by varying the length of support element 5 and/or clamped in position. A pair of rear brackets 19 attached to the seat 2 support the other end of the pivoting undercarriage 21, whilst also acting as an attachment point for a pivoting pair of wishbone elements 17. A pivoting rear strut 4 is attached to wishbones 17 and rear seat mounted bracket 13 via a releasable clevis 8. The clevis 8 may be sprung loaded, with a sprung bayonet-type pin/bracket.

Braking elements 14, which are preferably drum or disc brakes, are attached to hubs 80 and operated by levers 12 attached to seat 2. The braking may remain applied by use of a rocking lever 9 for parking for example. By applying each of the brake levers 12 with varying effort, in addition to dynamic braking a degree of steering may be achieved. This offers a mechanical advantage on downhill descents and therefore improved security over grasping the wheelrims by hand.

The structural seat 2 also has attachment points for the removable sideplates 16 and a mounting socket 20 for receiving an umbrella 24 (or another accessory such as a transfer board or food tray).

In FIG. 1 the rear strut 4 is shown as a gas spring or shock absorber with a lockable piston rod. As shown it is at its shortest length and the position of seat 2 is fully reclined, with the centre of gravity at its lowest position. In this position footrest 7 and anti tip rollers 22 are raised offering the most ground clearance. A lever 6 is coupled to a lock/release valve for the gas strut 4. By depressing lever 6 (thereby unlocking the gas strut 4) and with the user leaning his torso forwards, the gas in the strut 4 is allowed to expand. This allows the strut to regain its longest length and as the seat 2 naturally pivots about the wheel centres, the upright seat position shown in FIG. 2 is attained. To recline the seat 2 back again, the lever 6 is depressed and the user's weight lowers the backrest back down. If the user's weight is insufficient he can pull against wishbone 17. The seat angle can be locked in any position by releasing the lever 6. The rear strut 4 may be adapted to always provide a cushioning effect to the user, regardless of the length to which it is allowed to extend.

Thus, the effect of altering the length of the rear strut 4 is to vary the backrest angle, to vary the ground clearance of the footrest 7 and the anti tip rollers 22, to change the height of the centre of gravity of the wheelchair, and to change the forward or aft position of the centre of gravity relative to the wheelchair axles.

As an alternative to a gas spring or shock absorber 4, any lockable adjustable-length strut may be used, such as a telescopic shaft, a rack and pinion arrangement, a threaded shaft, a shortening linkage, and so on. This disclosure is intended to encompass and apply to any such mechanisms that are known to those skilled in the art, as well as those which have yet to be invented or developed.

If the feature of the length-adjustable strut 4 is not required, a solid unadjustable strut 4 may be provided instead.

Figure 3:
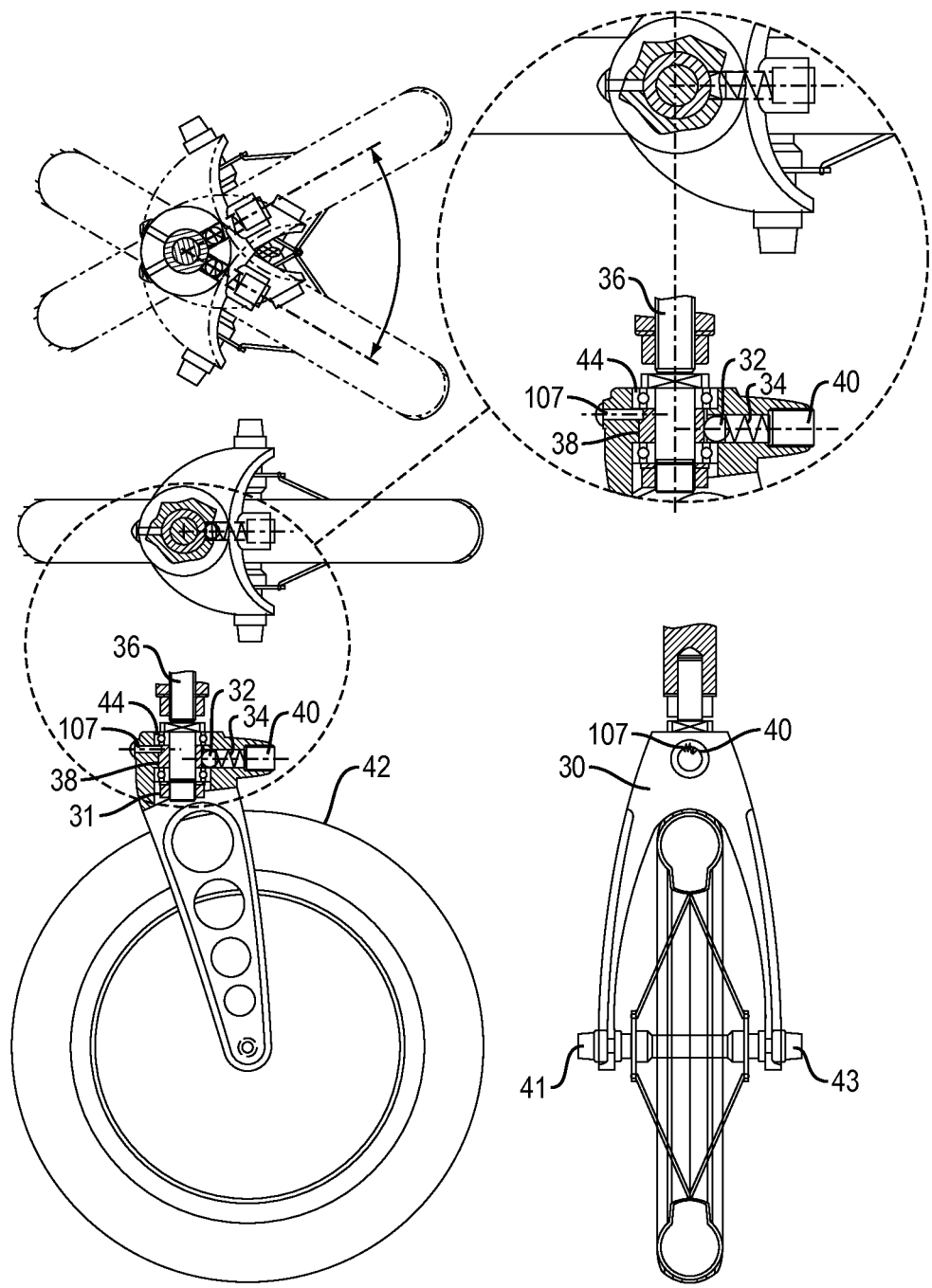
FIG. 3 shows a part sectional plan view and side views of the rear castor of the wheelchair of FIG. 1, including a detent mechanism for retaining the castor in a fixed position, and including a representation of the scope of angular displacement of the castor.
Figure 3A:
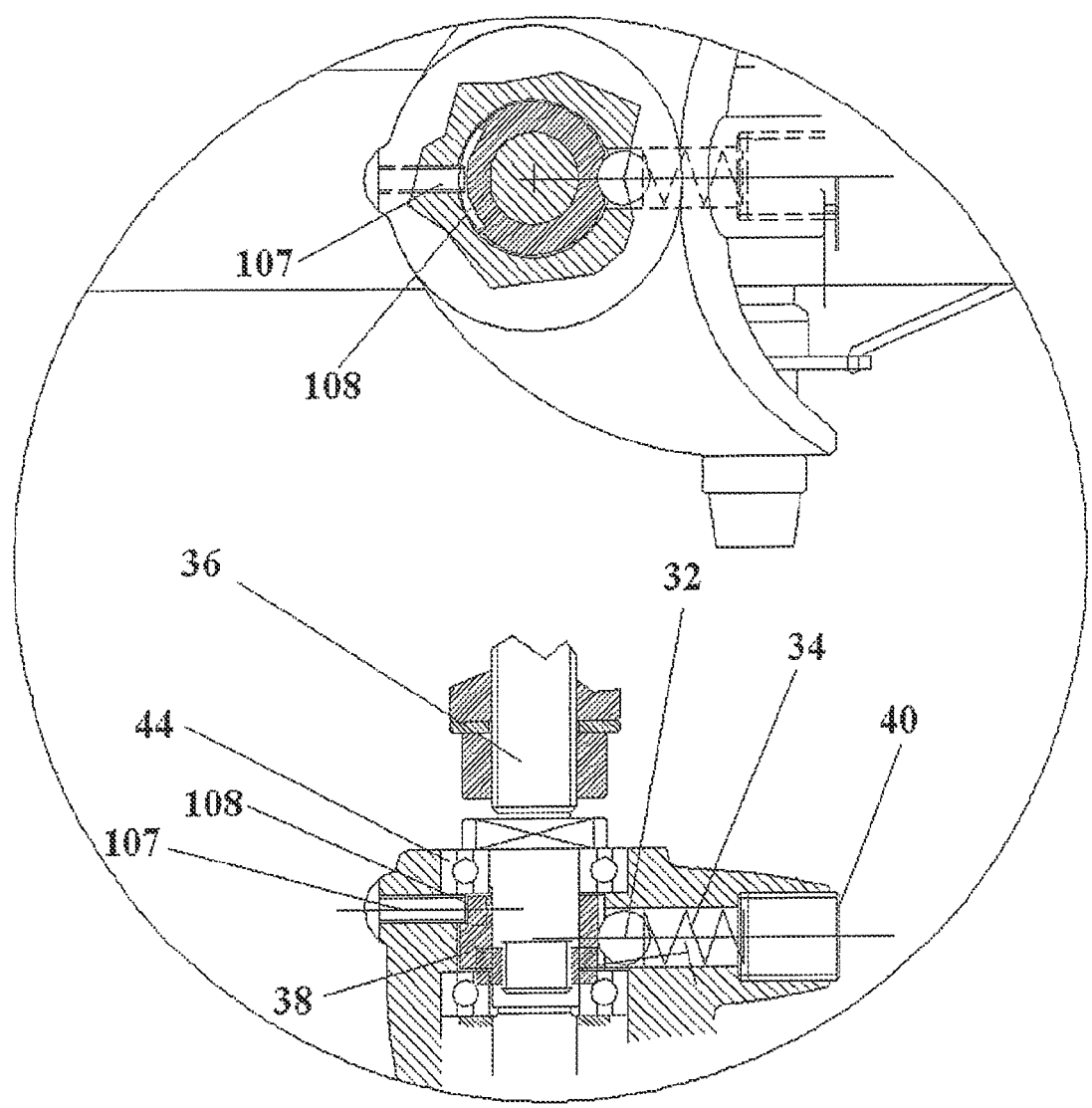
FIG. 3A is a detailed view of the indicated area of FIG. 3.

As shown in FIGS. 3 and 3a, the castor wheel 42 may be releasably fixed into its straight-ahead position by a detent mechanism. The castor assembly initially comprises of a conventional forked body 30, which contains a pair of bearings 44, into which a pivot shaft 36 passes, secured by a nut 31 which may have additional an securing device, such as a split pin. The wheel/axle/tyre assembly 42 is attached to the body 30 via securing nuts 41, 43 at each end of the axle, in the conventional way.

Between the bearings 44 and keyed to the pivot shaft 36 is an annular ring 38, having a cam profile. A ball 32 is held against the ring 38 by a spring 34, and is retained by one or more grub screws 40. The action of the ball 32 and the spring 34 acting on the cam ring 38 serves to urge the cam ring 38, and thus the castor wheel 42, into the straight ahead position. This advantageously improves the directional control of the wheelchair, removing unwanted sideways rotation of the castor wheel, whilst still enabling it to rotate sideways when the wheelchair is intentionally steered.

The one or more grub screws 40 may be adjusted inwardly or outwardly against the spring 34, which has the consequence of adjusting the degree to which the castor wheel 42 is urged into the straight ahead position. With the grub screw(s) 40 fully inwardly tightened, the castor wheel 42 may be locked in the straight ahead position. With the grub screw(s) fully outwardly positioned, the spring 34 and ball 32 may have little or no biasing effect on the direction of alignment of the castor wheel 42.

Alternatively, other adjustment means, instead of grub screw(s), may be provided to adjust the degree to which the castor wheel is urged into the straight ahead position.

The castor is provided with rotational restriction means comprising a screw 107, which extends through a tapped hole in the body 30, and a machined recess 108 provided in the annular cam ring 38. The recess 108 extends around a portion of the annular cam ring, and is formed so as to receive the end of the screw 107. The recess 108 is positioned such that the central axis of the screw 107 is higher than the central axis of the ball 32, spring 34 and grub screw 40 (as illustrated for example in the lower part of FIG. 3a).

In an alternative embodiment, the central axis of the screw 107 could be lower than the central axis of the ball 32, spring 34 and grub screw 40.

Referring to the upper part of FIG. 3a, it can be seen that the positioning of the end of the screw 107 into the recess 108 acts to restrict the rotation of the annular cam ring 38 to the limits of the recess 108, thereby limiting the angular displacement of the castor. The extent of the restriction is determined by the extent of the recess, i.e. by extending the recess further around the annular cam ring 38, the limitation of angular displacement of the castor is reduced.

The screw can be removed from the castor if restriction of the angular displacement of the castor is not required. When the screw is removed from the tapped hole, it can be replaced by a grease nipple (not shown).

FIG. 4 shows the wheelchair with the wheel camber angle, if any, matching the fixed mounting hubs, as described in FIG. 1. The camber angle in this derivative is fixed (i.e. is non adjustable).

Figure 5:
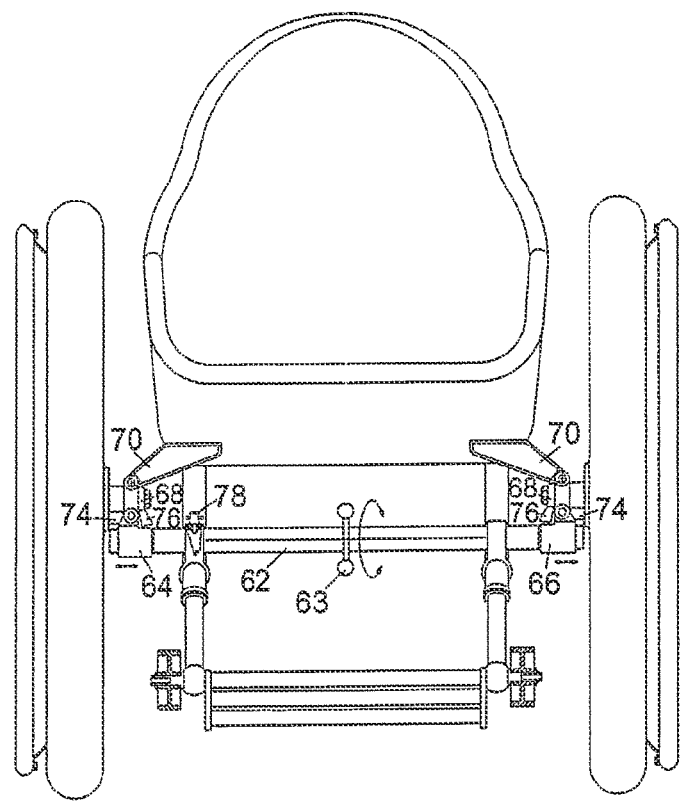
FIG. 5 is a frontal view of the wheelchair of FIG. 1 showing an adjustable wheel camber configuration with wheels shown parallel (or zero degrees camber)
Figure 6:
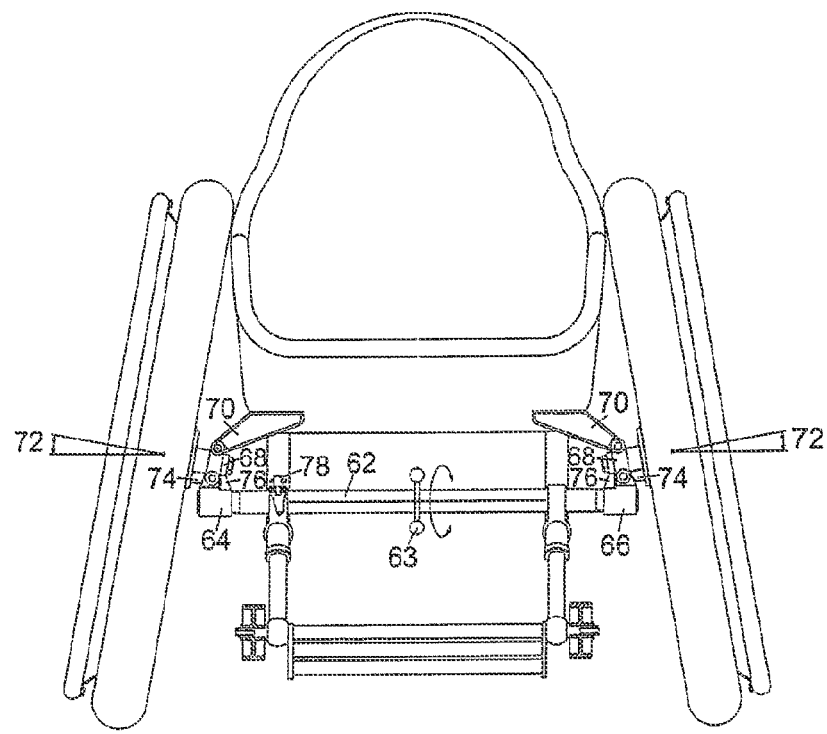
FIG. 6 is a frontal view of the wheelchair of FIG. 1 showing an adjustable wheel camber configuration with the wheel camber at a maximum angle.

In FIGS. 5 and 6 an adjustable camber mechanism is shown. In this case the cross shaft 62 may be threaded at one end with a left hand thread and at the other with a right hand thread. The cross shaft may have an integrated hand wheel 63, with which it is possible to rotate the shaft. Carried at the ends of the shaft are a pair of lower pivot bosses 64, 66 which may be correspondingly threaded. Pivoting on these are a pair of hubs 68, which also pivot against a pair of upper fixed pivot brackets 70. The wheels may be releasably attached to the pivoting hubs 68 as previously described.

By rotating the threaded cross shaft and handwheel, the lower threaded pivot bosses 64, 66 are driven either inwards or outwards, depending on the direction of rotation of the handwheel 63. This causes the hubs 68 to pivot, therefore altering the camber angle 72 of the wheels. (The camber angle 72 is defined by the angle between the horizontal and the axis of rotation of the wheel, when the wheelchair is situated on a horizontal surface.)

It will be appreciated that the general four pivot arrangement is of trapezium form. Unless locked in position the arrangement, that is the hubs 68, cross shaft 62 and boss assembly 64, 66, would be free to swing from side to side, despite being coupled to the telescopic undercarriage 21. Consequently the hub bodies may be provided with integrated lugs 74 and 76 which engage firmly onto the shaft or lower pivot bosses in the zero and full camber positions respectively, when the handwheel is fully tightened. Further a locking pin or screw 78 may be provided for additional security.

In another case, the rotation of the cross shaft 62 may be effected by another means (not shown) such as a bevel gear arrangement. In this case the cross shaft 62 would have a crown wheel attached in place of the handwheel. This would run in a housing that would contain an interconnecting bevel gear or pinion, which could be connected to a shaft, which could be in turn operated by a handle.

Alternatively a linkage or belt driven arrangement could be employed with or without a clutch type device, the cross shaft rotation of which may be derived by the rotation of the driving wheels.

In another case it may be that the cross shaft and lower pivot bosses may be not threaded at all, but free sliding, possibly on linear bearings, the camber angle being temporarily reduced by the user pushing the wheelrims outermost, whilst rolling. When the rims are released the maximum camber angle may be naturally reinstated. Springs may be employed to bias the linkage, and to urge the wheels back into either a position of maximum camber or, alternatively, to a position of zero camber, depending on how the springs are arranged.

Figure 7:
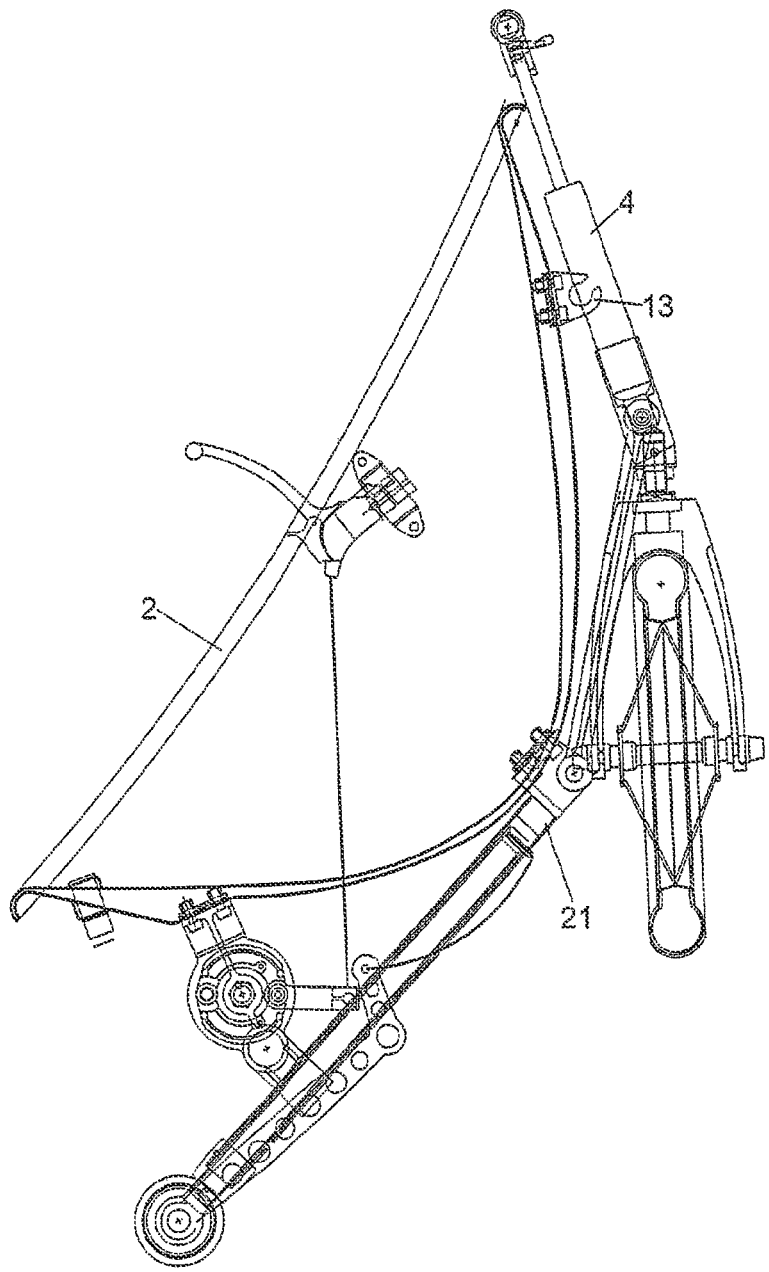
FIG. 7 is a side view of the wheelchair of FIG. 1 folded, with the wheels removed.

FIG. 7 shows the wheelchair folded for transport or storage. The releasable wheels 3 have been removed, the telescopic undercarriage 21 has been fully retracted and the rear castor and strut assembly has been released and placed in a folded position. The rear strut 4 rests between the rear mounting bracket 13 and is retained by a rubber grip, catch, loop or similar restraining device.

Figure 8:
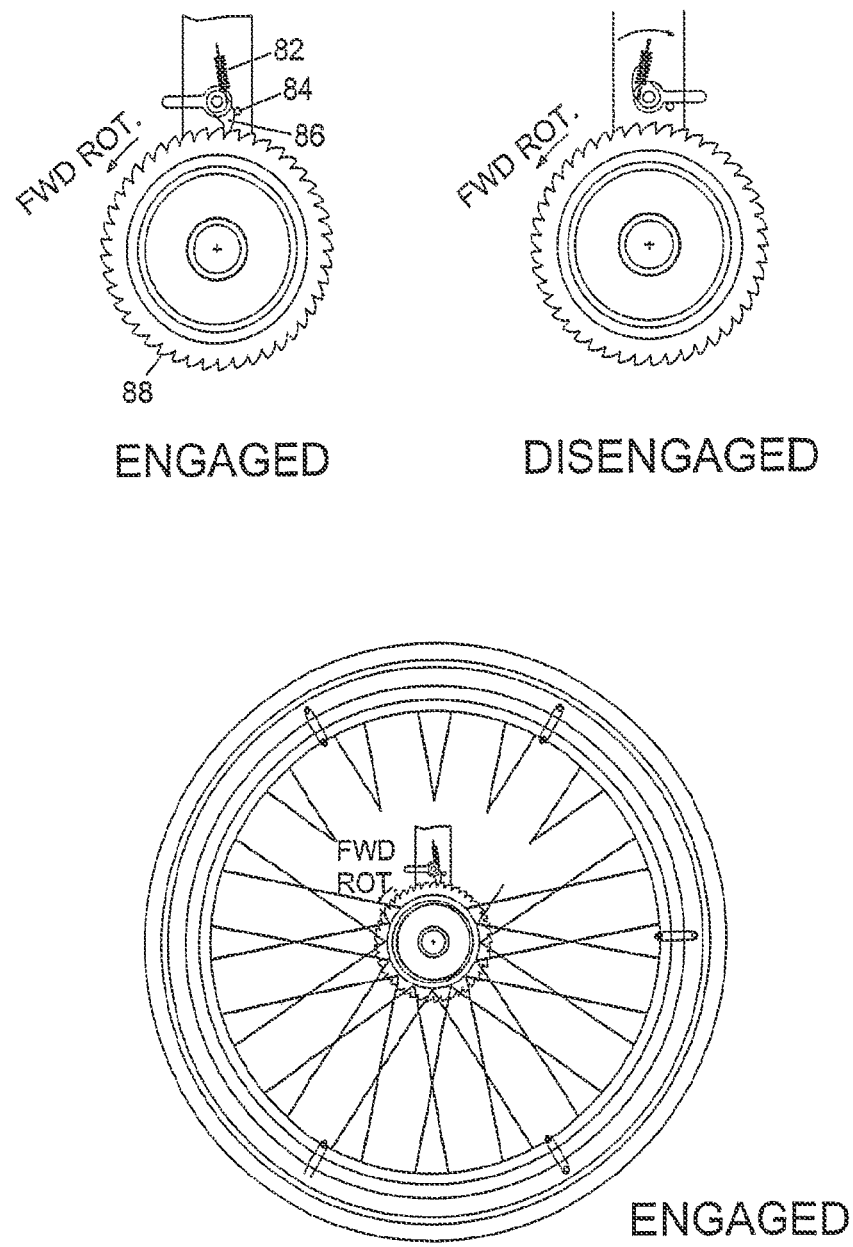
FIG. 8 is a side view of one the wheelchair wheels of FIG. 1, showing a ratchet mechanism for preventing unintentional backward motion.

FIG. 8 shows an annular ratchet 88 fitted to the inside face of each of the driving wheels 3. Attached to the hub is a lever engageable pawl retained by a spring 82. When engaged, the sprung loaded pawl 86 engages and prevents the wheel rotating backwards. The movement of the pawl is restrained by the stop pin 84. To disengage the feature, the pawl operating lever is rotated through 180 degrees, the spring 82 and stop pin 84 retaining it in position. The pawl 86 and the lever may be separate independent of each other.

Figure 9:
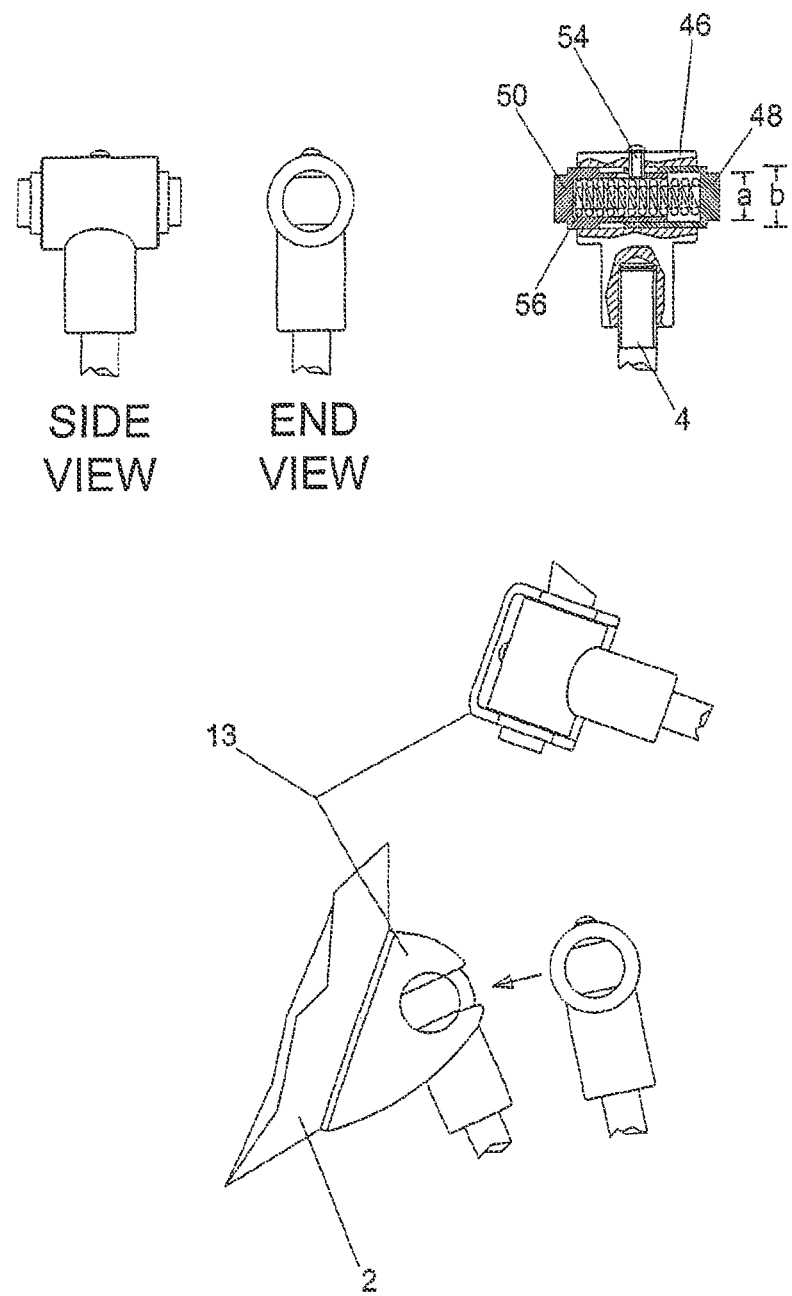
FIG. 9 shows various views, including a sectional view, of a quick release clevis arrangement attached to the top of the rear strut of the wheelchair of FIG. 1.

FIG. 9 shows various views of a quick release clevis which may be attached to the rear strut 4 and used to engage with the seat backrest-mounted bracket 13. In the section view it can be seen that the clevis arrangement consists of a body 46 and two outwardly sliding, piston-like members 48, 50, all preferably made of metal. Outward biasing movement of the piston-like members 48, 50 is afforded by an inner spring 56, and the members are retained by a screw 54 which engages with suitable slots in members 48 and 50. The rear strut 4 may be attached to the clevis via an internally threaded socket in the lower part of the main body 46. A securing lock nut or pin (not shown) may be used to secure.

The bracket 13, which is also preferably made of metal, is U-shaped and in profile contains a 'keyhole' shaped slot in each side. This keyhole-shaped slot incorporates a circular aperture and a substantially-parallel-sided guide slot. The spacing of the parallel sides of the guide slot in the 'keyhole' feature corresponds with the width 'a' between corresponding parallel flats machined on an outer region of each of the sliding members 48, 50. The diameter of the circular aperture in the 'keyhole' region corresponds with the diameter 'b' of a circular cross-section inner region of each of the sliding members 48, 50.

To connect the sliding members 48, 50 to the clevis, the parallel-sided outer region (width a) of each sliding member is slid (with the spring 56 in compression) along each parallel-sided guide slot and into the corresponding circular aperture in the clevis, at which point the outwardly-biased resilient nature of each sliding member 48, 50 causes the circular cross-section region (diameter b) of the member to move outwards and engage with the corresponding circular aperture. The circular cross-section region of each sliding member 48, 50 is able to rotate within the circular aperture, thereby enabling pivoting of the strut 4.

To disengage the strut 4 from the bracket 13, the sliding members 48, 50 may be squeezed together between forefinger and thumb, whereupon the engaging diameter part of each sliding member slides within the body 46. This enables the clevis to be disengaged by sliding the parallel-sided outer region of each sliding member 48, 50 along the corresponding guide slot and thence away from the clevis.

Whilst a sprung loaded pin-type clevis arrangement is well known, locating the pin within the receiving bracket whilst it is depressed can be awkward. With the present embodiment, the engaging and protruding machined flats and the corresponding guide slots allow the sliding members 48, 50 to be depressed, while at the same time perfectly aligning the diameter portion, prior to engagement. A single handed quick release fitting is thus afforded.

To further facilitate the introduction of the sliding members 48, 50 into the parallel-sided guide slots, the entry region of each parallel-sided guide slot may be tapered or chamfered, the tapering or chamfering being such as to cause the sliding members 48, 50 to move inwardly and thereby compress the spring 56 automatically, without the user needing to manually compress the spring (e.g. between thumb and forefinger).

Instead of providing a pair of circular apertures and associated parallel-sided guide slots in which the sliding members 48, 50 locate in the clevis 13, a pair of circular recesses (i.e. which do not pass through the entire thickness of the clevis material) and parallel-sided guide recesses or channels (again which do not pass through the entire thickness of the clevis material) may alternatively be provided.

FIGS. 10 to 17 illustrate a brake system which allows alternative parking or dynamic braking operable by the same brake lever. A dynamic brake is applied to reduce the speed of the wheelchair, to bring the wheelchair a complete stop if necessary, and a parking brake is applied when the wheelchair is stationary. The drawings show one side of the braking system; the opposite side is identically equipped to form the system.

Figure 10:
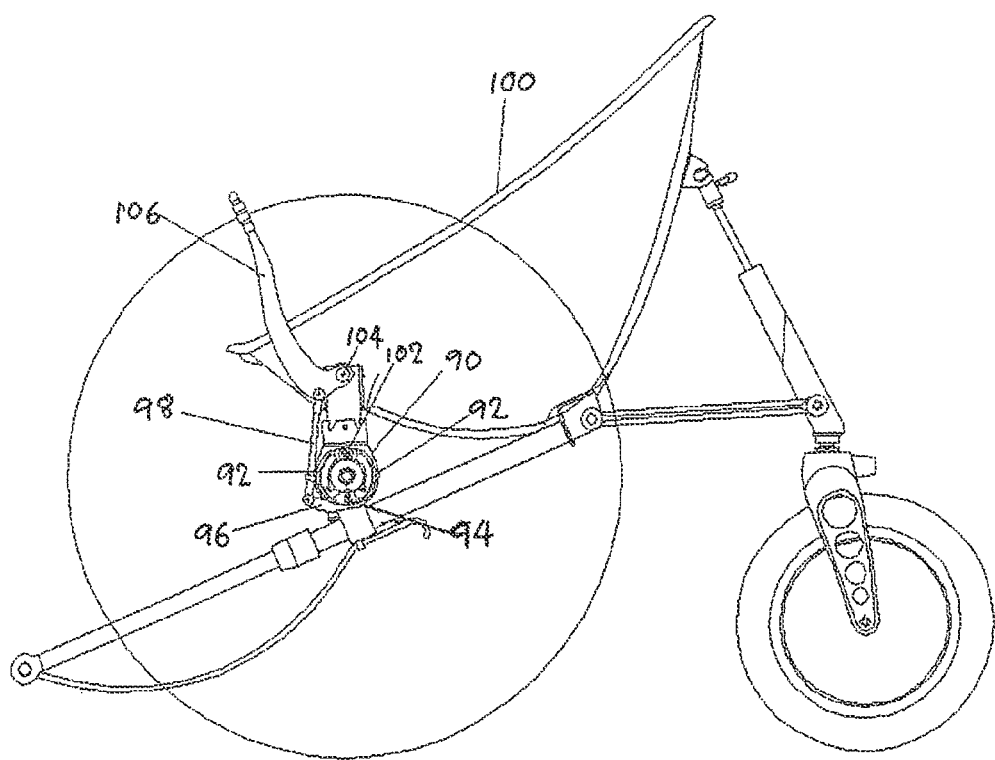
FIG. 10 is a side elevation of wheelchair incorporating a combined dynamic and parking brake system in a rest position.
Figure 11:
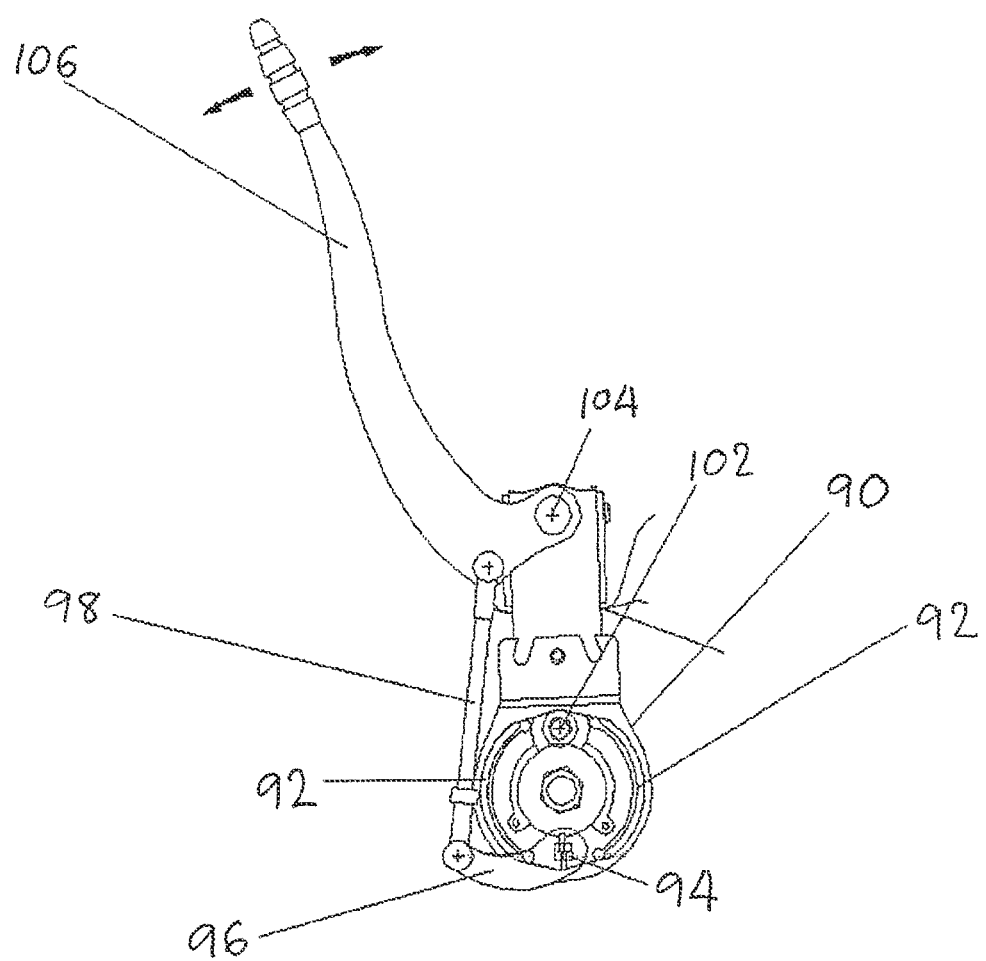
FIG. 11 is detailed view of the brake system of FIG. 10.
Figures 15, 16, 17:
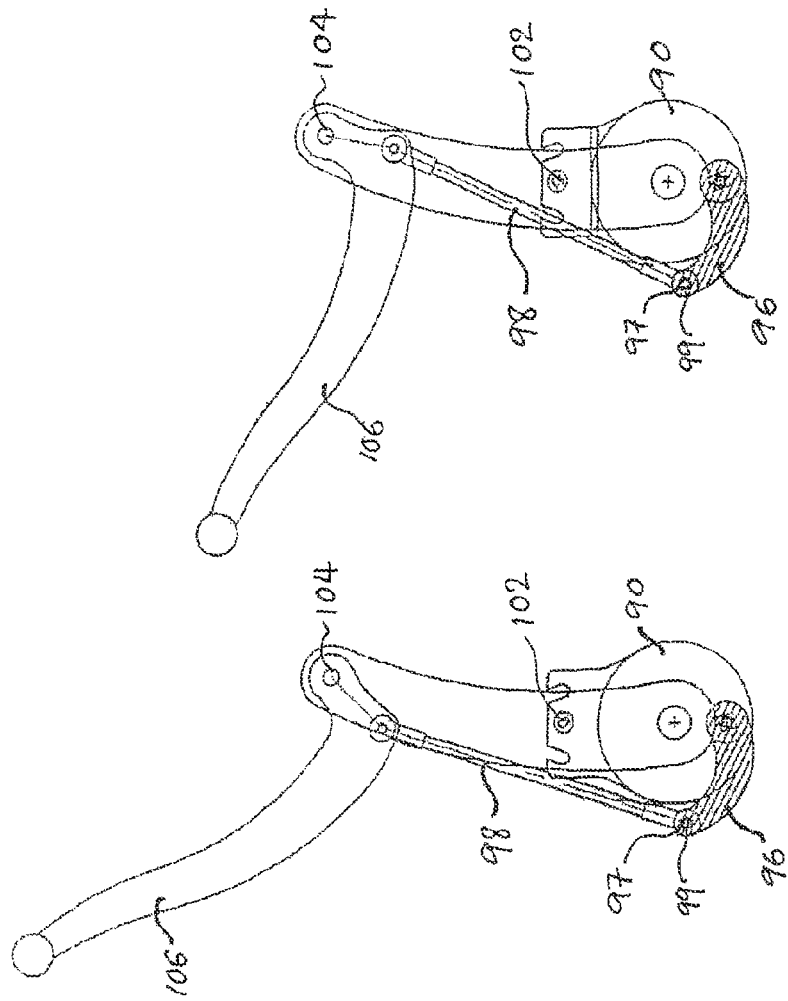
FIGS. 15 to 17 are detailed side elevations of the brake system in of FIG. 10 in the rest position, with the parking brake being applied and with the parking brake fully in position respectively.

FIGS. 10 and 15 show side views of the wheelchair with the braking system in a rest position, i.e. with neither the parking or the dynamic brake being applied. FIG. 11 shows an enlarged view of the system, which comprises a generally understood expanding brake drum assembly 90. Two sprung loaded brake shoes 92 expand and engage within the hub of the front drive wheels (outline only shown) in a conventional manner. Brake shoes 92 expand in tandem by virtue of a first pivot 102 and an operating cam 94. The rotation of operating cam 94 is effected by that of a cam lever 96, which is connected to an adjustable, ball ended tie rod 98, which in turn is connected to a brake lever 106. Brake lever 106 rotates by virtue of the second pivot 104 and when free remains in the position shown in FIG. 11, due to the brake shoes 92 being spring loaded.

The arrangement of the brake system is such that the operating cam 94 can expand the brake shoes 92 by rotating in either a clockwise or an anti-clockwise direction.

Figure 12:
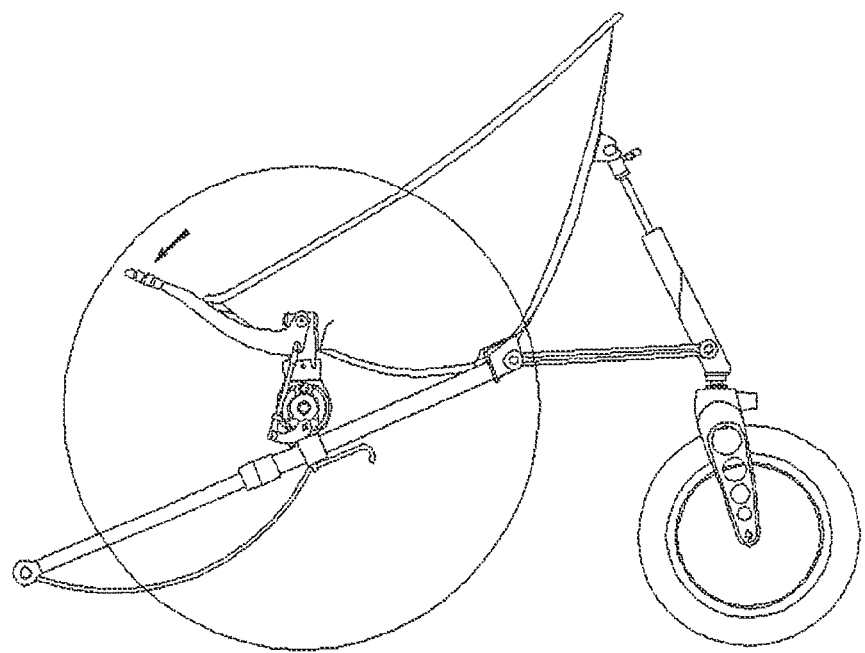
FIG. 12 is a side elevation of the wheelchair of FIG. 10 with the brake system in a locked position with the parking brake applied.

FIGS. 12 and 17 show the brake lever 106 in the parking position, i.e. with the brakes locked on. By applying effort to the brake lever 106 in an anti-clockwise direction, the tie rod 98 forces the cam lever 96 to rotate also anti-clockwise, which in turn forces the brake shoes 92 against the hub. FIG. 16 shows the action of the brake system as the parking brake is being applied. Normally the sprung brake shoes 92 would return the brake lever 106 to the rest position when released. However in the current embodiment, the tie rod 98 can be moved 'over centre', i.e. beyond an intersecting line between the second pivot 104 and a third pivot 97 (represented by the ball end 99 of tie rod 98 which attaches to cam lever 96), and remain locked, thus effecting a reliable parking brake. When so applied, the tie rod 98 rests against a stop (not shown).

To release the parking brake, the brake lever 106 is rotated in a clockwise direction.

Figure 13:
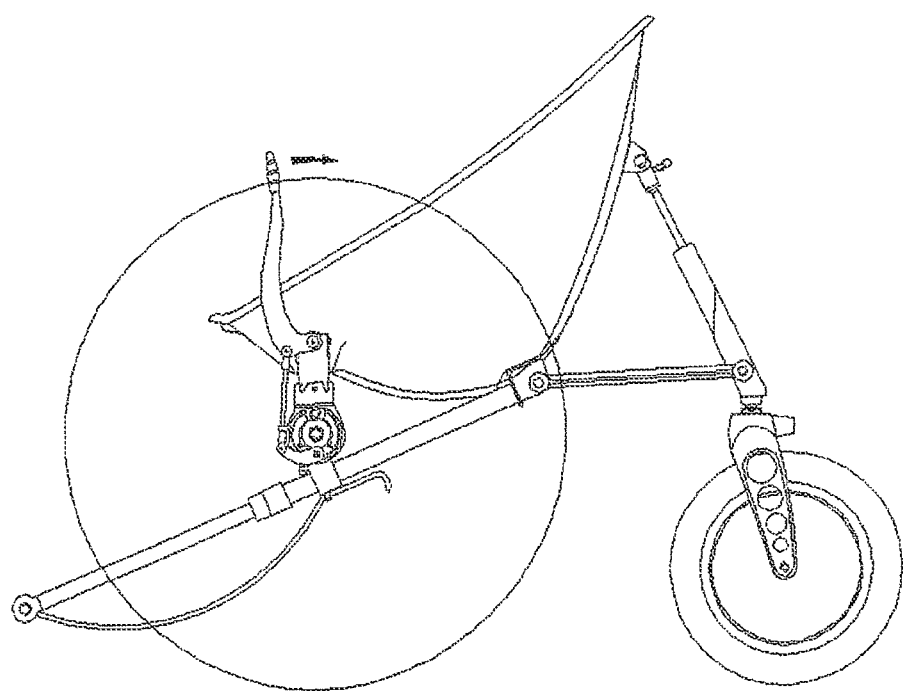
FIG. 13 is a side elevation of the wheelchair of FIG. 10 with the brake system showing the dynamic brake being applied.

FIG. 13 shows the brake lever 106 being applied in a clockwise direction. This again applies the brake shoes 92 and is useful when the wheelchair is in motion, or when stopping momentarily. As each wheel has its own independent brake system a degree of steering is also available by applying differential efforts to the brake levers 106. When the brake levers 106 are released they return to the rest position.

Figure 14:
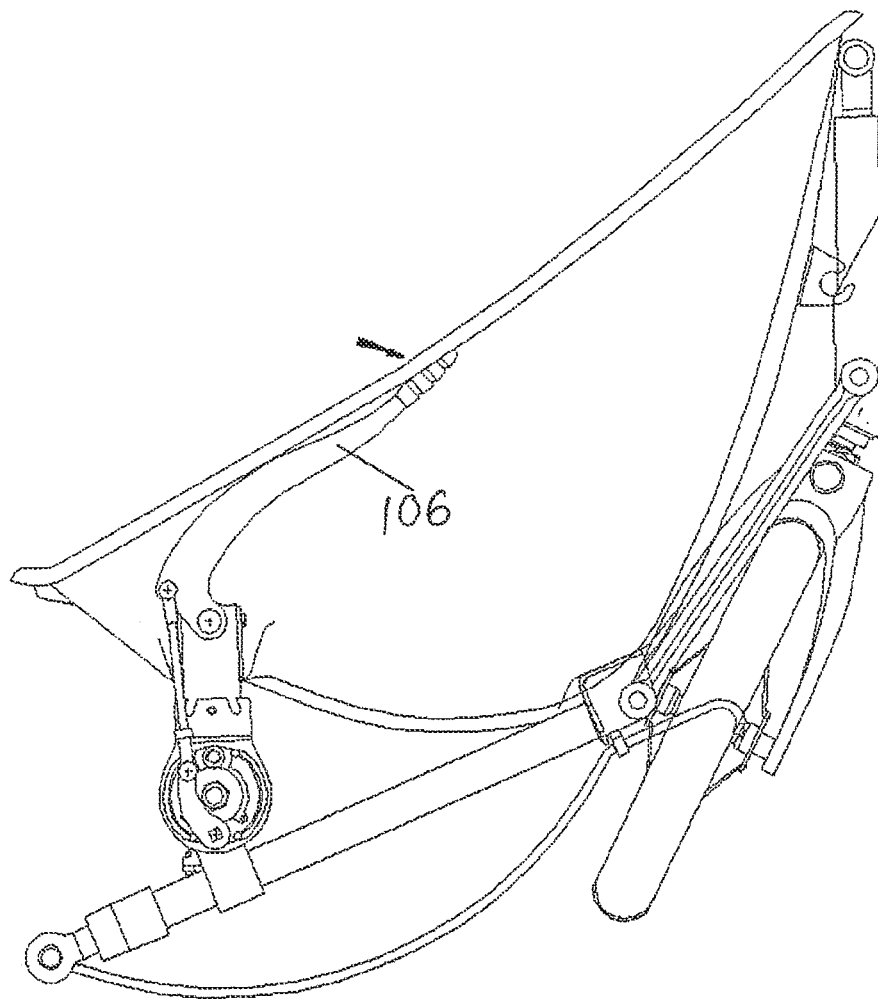
FIG. 14 is a side elevation of the brake system of FIG. 10 with the brake lever retracted.

FIG. 14 shows the wheelchair in a folded position, and particularly the brake levers 106 which are rotated fully clockwise. In this position the tips of the brake levers 106 can be located and secured under the curved flange of the monocoque seat 100. As previously described, they are sprung loaded and therefore remain in this unobtrusive and advantageous position. With the quick release drive wheels removed and the other collapsible elements folded, finally securing the levers, affords a compact method of transporting the wheelchair when not in use.

Although the invention has been particularly described in relation to a wheelchair, it will be appreciated that the principle of a personal wheeled vehicle in which the seat forms a structural member to which the wheels are attached may be applied to other personal vehicles. Moreover, the other principles described herein with respect to wheelchairs may also be applied to other personal wheeled vehicles. It is also important to note that the various principles described herein may be applied separately or in any combination, depending on the requirements of the wheelchair or wheeled vehicle.

Also, whilst this specification describes a manual device, it can be envisaged that, in another case, one or more of the components shown may be implemented in a motorised form.

The invention claimed is:

1. A wheeled vehicle, including a pair of ground-engaging wheels, each connected to a respective pivotable hub, each pivotable hub being pivotably attached to a body of the vehicle by a respective first fixed pivot member and pivotably attached to a respective laterally-adjustable pivot member, wherein each laterally-adjustable pivot member incorporates a thread and is threaded onto a cross-shaft that may be rotated in order to adjust the position of said laterally-adjustable pivot members and cause the pivotable hubs to pivot and thereby adjust a camber of said pair of wheels simultaneously, and wherein the pivotable hubs are each provided with one or more lugs arranged to engage the respective laterally-adjustable pivot member when said wheels are in a minimum or maximum camber position.

2. A wheeled vehicle as claimed in claim 1, wherein each laterally-adjustable pivot member is threaded onto the cross-shaft using a mutually opposing thread.

3. A wheeled vehicle as claimed in claim 1, comprising a user seat, said pair of front ground-engaging wheels positioned on opposite sides of the user seat, and a single rear castor ground-engaging wheel positioned centrally behind the user seat, wherein the rear castor ground-engaging wheel is provided with a detent mechanism arranged to bias the wheel into a configuration in which it is parallel with the front wheels.

4. A wheeled vehicle as claimed in claim 1, wherein the wheeled vehicle is a wheelchair.

\* \* \* \* \*